United States Patent [19]
Anderson

[11] Patent Number: 5,557,526
[45] Date of Patent: *Sep. 17, 1996

[54] LOAD MONITORING SYSTEM FOR BOOMS

[75] Inventor: Thomas M. Anderson, Hugo, Minn.

[73] Assignee: Schwing America, Inc., White Bear, Minn.

[ * ] Notice: The term of this patent shall not extend beyond the expiration date of Pat. No. 5,359,516.

[21] Appl. No.: 310,848

[22] Filed: Sep. 22, 1994

Related U.S. Application Data

[63] Continuation-in-part of Ser. No. 122,641, Sep. 16, 1993, Pat. No. 5,359,516.

[51] Int. Cl.[6] .................................................. G06F 07/70
[52] U.S. Cl. ................ 364/424.07; 364/556; 364/567; 340/685; 212/238; 73/862.581
[58] Field of Search ................ 73/37, 49.4, 862.51, 73/862.581; 200/83 W; 212/238; 340/665, 666, 685; 364/424.04, 424.07, 508, 556, 567

[56] References Cited

U.S. PATENT DOCUMENTS 1,352,150 9/1920 Schneider .
3,486,136 12/1984 Howard ............................... 414/21
3,641,551 2/1972 Sterner et al. ..................... 34/267
3,777,555 12/1973 Petrisko et al. ..................... 73/91
3,902,359 9/1975 Allen ................................ 73/133
4,185,280 1/1980 Wilhelm ............................ 340/685
4,222,491 9/1980 Geppert ............................ 212/153
4,500,969 2/1985 Hasselmann et al. ............. 364/508
4,636,962 1/1987 Broyden et al. .................. 364/478
4,764,882 8/1988 Braschel et al. ................. 364/508
4,884,223 11/1989 Ingle et al. ....................... 364/550
5,076,449 12/1991 Clutter ............................. 212/157
5,160,055 11/1992 Gray ................................ 212/150
5,163,570 11/1992 Mundis et al. .................. 212/155
5,187,973 2/1993 Kunze et al. .................... 73/40.5 R
5,359,516 10/1994 Anderson ...................... 364/424.07

Primary Examiner—Emanuel T. Voeltz
Assistant Examiner—Craig Steven Miller
Attorney, Agent, or Firm—Kinney & Lange

[57] ABSTRACT

A system for and method of monitoring the operation of a boom are disclosed. A first parameter is sensed, the first parameter being indicative of a load on a first boom component. It is determined from the sensed first parameter when a load supported by the first boom component exceeds a predetermined value. Information, indicative of one or more occurrences of loads on the first boom component which exceed the predetermined value, is stored. Based upon the stored information, an output is provided which is indicative of whether a boom warranty is in effect.

25 Claims, 5 Drawing Sheets

LOAD MONITORING SYSTEM FOR BOOMS

This is a continuation-in-part of application Ser. No. 08/122,641 filed Sep. 16, 1993 now U.S. Pat. No. 5,359,516.

BACKGROUND OF THE INVENTION

The present invention relates to systems for monitoring the operation of a boom. In particular, the present invention relates to a system for monitoring operation of a boom in which loads or forces on the boom's components are sensed, information based upon the sensed loads or forces is stored, and an output is provided based upon the stored information which is indicative of potential causes and predicted timing of boom failure.

Boom systems frequently include a boom with one or more boom sections which are typically used to lift a load or reach to a particular distant location, a rotational actuator mechanism such as a rack and pinion mechanism for rotating the boom, and outriggers or extendable support legs for stabilizing the boom. Each boom section has a corresponding actuator assembly which supports the boom section as well as any load supported by that boom section. Typically, the actuator assemblies are hydraulic piston/cylinder assemblies. Forces generated by the actuator assemblies and by lifted loads or obstacles making contact with the boom act upon boom components during boom system operation. The maximum loads or forces that the actuator assemblies, boom sections and other boom system components are structurally designed to withstand are generally known by the boom manufacturer. This information may be translated to maximum loads or forces that each of the boom's structural or mechanical components can support or withstand without exceeding design limitations.

Boom systems are frequently subjected to work conditions in which loads supported by and forces experienced by the boom exceed design limitations. These excessive conditions can be caused for example by lifting excessive loads, by attempting to extend the boom while a section of the boom is pinned against a wall or other obstacle, by a foreign object such as a separate piece of machinery falling on a section of the boom, and by rotating the boom while a boom section or a distribution hose is tangled with an obstacle. Abuses such as these occur in construction applications on a daily basis. Frequently, the result is shortened boom life and/or the failure of one or more boom sections, actuator assemblies, outriggers or other components.

A very common problem experienced by boom manufacturers is that customers frequently deny that a failed boom was subjected to abusive conditions. In lawsuits in which someone was injured by a cracked boom or a boom which has tipped over, boom manufacturers frequently find it difficult to prove that the failure was caused by abuse, and not by a defect in the boom. Also, frequent abuse of booms makes it difficult for boom manufacturers to offer warranties to their customers. Fixing or replacing boom components which have failed as a result of being subjected to excessive loads, as opposed to being the result of manufacturing defects, is typically cost prohibitive.

Even if a boom is not subjected to loads which exceed design limitations, boom components may still experience fatigue failure because of the repetitious nature of boom movements under loaded conditions. Because fatigue failure is dependent upon the total number of cycles experienced by the boom components, and because the manufacturer has no way to determine how many cycles a particular user will put the boom through in a given period of time, predicting when boom components will experience fatigue failure is extremely difficult.

SUMMARY OF THE INVENTION

The present invention is based upon the recognition that a boom monitoring system which senses and records occurrences of loads and/or forces on the boom's components which exceed predetermined values offers increased safety, more reliable maintenance scheduling, improved failure analysis and increased accuracy in determining whether a boom warranty is in effect.

The monitoring system of the present invention monitors operation of a boom having components such as one or more boom sections, one or more outriggers for supporting and stabilizing the boom, and a hydraulically driven system for rotating the boom and raising and lowering the boom sections. A first parameter, indicative of individual and/or total loads or forces acting upon a boom component is sensed. It is determined, from the sensed first parameter, when a load supported by or a three acting upon the boom component exceeded a predetermined value. Information is stored, the information being indicative of an occurrence of a load or force experienced by the boom component which exceeded the predetermined value. Based upon the stored information, an output is provided which can be used to analyze and/or predict possible causes of boom failure.

In preferred embodiments of the present invention, the predetermined value bears a known relationship to a maximum recommended load or force for the particular boom component. The output then represents one or more occurrences of loads or forces experienced by the boom component which exceeded the predetermined value. In other preferred embodiments, the output further represents dates and/or times of each of the one or more occurrences of loads or forces experienced by the boom component which exceeded the predetermined value.

DETAILED DESCRIPTION OF THE PREFERRED EMBODIMENTS

A. BOOM SYSTEM 10

Figure 1:
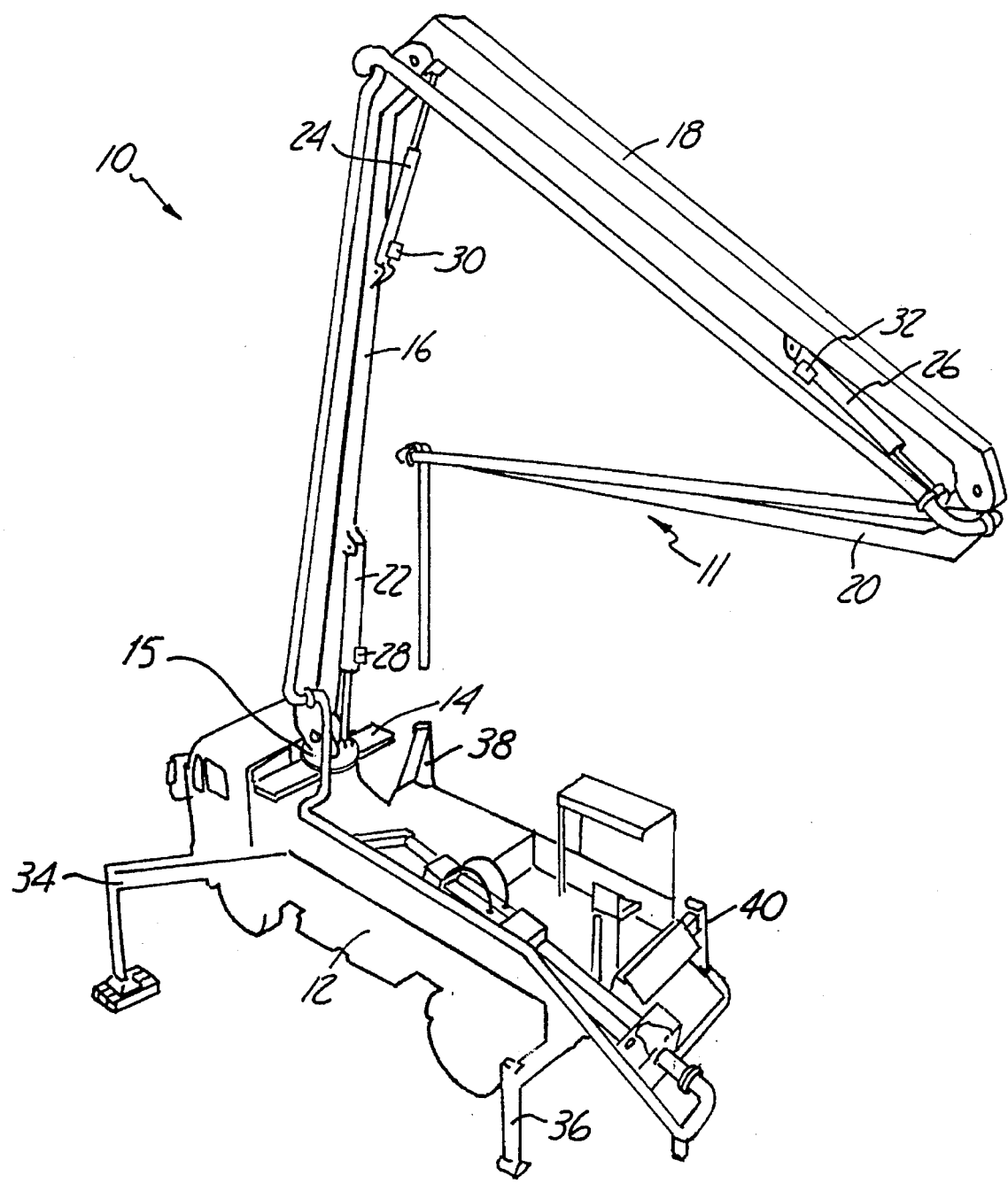
FIG. 1 is a perspective view of a truck mounted boom system in accordance with the present invention.

FIG. 1 shows a perspective view of truck mounted boom system 10. Boom system 10 includes boom 11 and truck 12.

Boom 11 includes boom turret 15, first boom section 16, second boom section 18, third boom section 20, first actuator assembly 22, second actuator assembly 24, third actuator assembly 26, first load sensor 28, second load sensor 30 and third load sensor 32. Truck includes hydraulically driven outriggers or support legs 34, 36, 38 and 40 which are used to stabilize boom system 10 against the weight of boom 11 and any load carried by boom 11.

Turret 15 of boom 11 is mounted on truck 12 to support boom sections 16–20. In preferred embodiments, turret 15 is rotated by a rotational actuator or drive mechanism such as a rack and pinion mechanism or a motor driven gear mechanism to rotate boom 11. Although typically the rotational drive mechanism is a hydraulically driven drive mechanism, turret 15 can be rotated by means of other types of drive mechanisms as well.

One end of boom section 16 is pivotally connected to turret 15. A second end of boom section 16 is pivotally connected to a first end of boom section 18. Likewise, a second end of boom section 18 is pivotally connected to a first end of boom section 20. Although in the embodiment shown in FIG. 1 boom 11 has three boom sections, in other preferred embodiments boom 11 can include any number of boom sections, with a minimum of one boom section.

Actuator assembly 22 is connected to turret 15 and boom section 16 for moving boom section 16 relative to turret 15. Actuator assembly 24 is connected to boom sections 16 and 18 for moving boom section 18 relative to boom section 16. Actuator assembly 26 is connected to boom sections 18 and 20 for moving boom section 20 relative to boom section 18.

In preferred embodiments, boom 11 is a hydraulic boom system and actuator assemblies 22–26 are hydraulic actuator assemblies. For example, in the preferred embodiment shown in FIG. 1, boom 11 is a hydraulic boom and actuator assemblies 22–26 are hydraulic piston/cylinder assemblies. However, it should be noted that actuator assemblies 22–26 can be any other type of actuator assembly capable of producing mechanical energy for exerting forces capable of supporting loads on boom sections 16–20 and for making boom sections 16–20 move relative to one another and relative to turret 15. For example, assemblies 22–26 can be a type of hydraulic actuator other than a piston/cylinder assembly. Also, actuators 22–26 can be pneumatic, electrical, or other types of actuators instead of being hydraulic actuators.

Each of load sensors 28–32 sense a parameter, related to the operation of a corresponding one of actuator assemblies 22–26, which is indicative of a total load supported by each of actuator assemblies 22–26. The total load supported by each of actuator assemblies 22–26 can be described in terms of the forces applied by actuators 22–26 on the corresponding boom sections. Specifically, load sensor 28 senses a parameter which is indicative of a total load supported by actuator assembly 22. Load sensor 30 senses a parameter which is indicative of a total load supported by actuator assembly 24. Load sensor 32 senses a parameter which is indicative of a total load supported by actuator assembly 26. The total load supported by each of actuator assemblies 22–26 includes a load component caused by the weight of the boom sections themselves as well as a load component caused by the weight of any external load supported by the boom. Additionally, the total load supported by any one actuator assembly is dependent upon the positions of the boom sections relative to one another and upon the position and distribution of the external load supported by boom 11.

In addition to providing an indication of a total load supported by each of actuator assemblies 22–26, information from each of load sensors 28–32 provides an indication of a total load on one of corresponding boom sections 16–20. If one or more of boom sections 16–20 are exposed to load conditions in excess of design limitations, cracks could occur in the overloaded boom sections. Additionally, as boom sections 16–20 are repeatedly extended and retracted under load conditions, the components of boom system 10 are subjected to fatigue stress and may eventually become inoperable or dangerous due to fatigue failure.

In the preferred embodiment illustrated in FIG. 1 in which actuator assemblies 22–26 are hydraulic pistons/cylinder assemblies, load sensors 28–32 are preferably pressure sensors which sense hydraulic pressure in each of the assemblies' hydraulic cylinder. The pressure in a particular hydraulic cylinder is indicative of a total load supported by the corresponding actuator assembly and of the forces experienced by the corresponding boom section.

Although the present invention is equally applicable to boom systems using actuator assemblies other than hydraulic piston/cylinder assemblies, for ease of illustration, descriptions of preferred embodiments are sometimes limited to booms with hydraulic piston/cylinder actuator assemblies. However, this is not intended to limit the present invention to boom systems with hydraulic piston/cylinder actuators.

B. MONITOR SYSTEM 100

Figure 2:
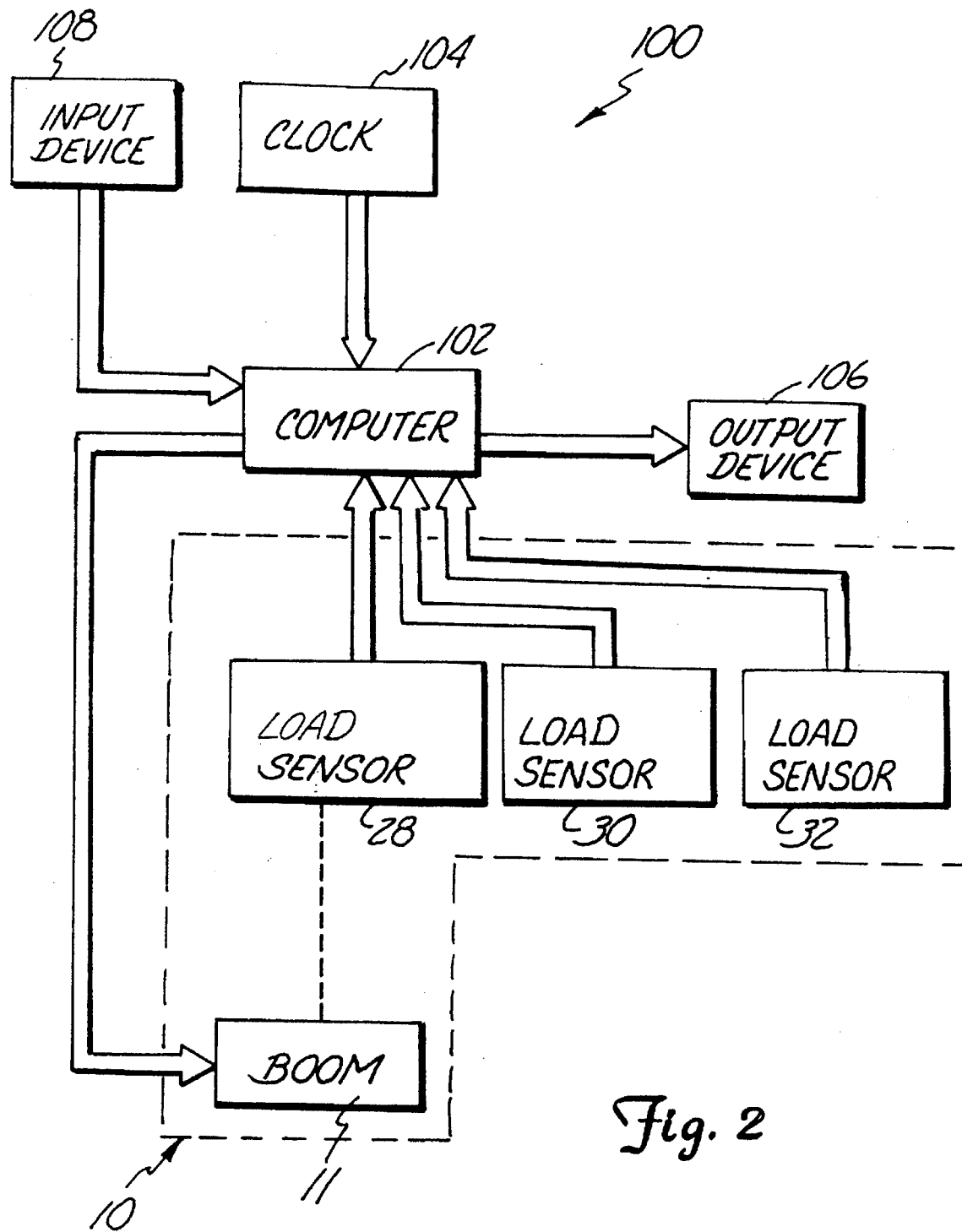
FIG. 2 is a block diagram of a monitoring system for booms in accordance with a first embodiment of the present invention.

FIG. 2 shows a preferred embodiment of a monitoring system which monitors the operation of boom system 10 to provide accurate information on the use of boom 11. Monitor system 100 is used to schedule boom maintenance, verify boom warranties and predict or analyze causes of boom failure. Monitor system 100 includes boom system 10, computer 102, clock 104, output device 106 and input device 108.

In preferred embodiments, computer 102 is microprocessor-based computer including associated memory and associated input/output circuitry. However, in other embodiments, computer 102 can be replaced with a programmable logic controller (PLC) or other equivalent circuitry.

Clock 104 provides a time base for computer 102. Although shown separately in FIG. 2, clock 104 may be contained as an integral part of computer 102. In preferred embodiments of the present invention, clock 104 provides computer 102 with date information as well as time information.

Output device 106 is preferably any of a number of devices. For example, output device 106 can include a display output such as a cathode ray tube or a liquid crystal display. Output device 106 can also be a printer, a chart recorder, a remote data storage device, or a communication device such as a cellular phone which transmits the output of computer 102 to another computer-based system which may monitor or control the overall operation in which boom system 10 is being used and/or which may be used to analyze and predict causes of boom failure. Analysis of boom failure is useful for purposes such as trouble-shooting, warranty verification, and proving that no manufacturing defect existed which caused the boom failure.

Input device 108 can also take a variety of forms. In one preferred embodiment, input device 108 is a keypad entry device. Input device 108 can also be a keyboard, a remote program device or any other suitable mechanism for providing information to computer 102.

Once again, load sensors 28, 30 and 32 monitor the loads supported by actuator assemblies 22, 24 and 26, respectively, and provide signals to computer 102 which are indicative of these loads. Although in the preferred embodiment shown in FIG. 1 each of actuator assemblies 22–26 is monitored by a load sensor 28–32, in other embodiments, one or more of actuator assemblies 22–26 is not monitored. For instance, in some embodiments, only the load on actuator assembly 22 is monitored to provide an indication of the total load supported by boom 11.

In preferred embodiments of the present invention one or more predetermined load values are stored in the memory of computer 102. At least one predetermined load value is stored for each actuator assembly monitored by system 100. However, in some preferred embodiments, multiple predetermined load values are stored for each actuator assembly monitored. In these embodiments, each of the multiple predetermined load values for a particular actuator assembly represents a different degree of loading on the actuator assembly. The significance of the different degree of loading is discussed below.

The predetermined load values may be supplied to computer 102 through input device 108, or may be preprogrammed into the memory of computer 102. In the preferred embodiments of the present invention in which actuator assemblies 22–26 are hydraulic piston/cylinder assemblies and load sensors 28–32 are hydraulic pressure sensors, the predetermined load values are predetermined hydraulic pressure values. In other preferred embodiments in which actuator assemblies 22–26 are not hydraulic piston/cylinder assemblies, the predetermined load values are predetermined values of the parameter sensed which correspond to predetermined loads or forces on one or more of actuator assemblies 22–26 and other corresponding boom system 10 components. For example, if actuator assemblies 22–26 are electrical actuators, the predetermined values can be current values.

Computer 102, which receives signals from sensors 28, 30 and 32, monitors the load on each of actuator assemblies 22, 24 and 26. Based upon the monitored load supported by each of actuator assemblies 22–26, computer 102 determines when the load on a particular actuator assembly and corresponding boom section has exceeded the one or more corresponding predetermined load values for that assembly.

Computer 102 stores information based upon the sensed loads on one or more of actuator assemblies 22–26. The stored information is indicative of loads on one or more of actuator assemblies 22–26 and is further indicative of loads which have been determined by computer 102 to have exceeded a corresponding predetermined load value. In some embodiments, computer 102 stores information indicative of all loads supported by one or more of assemblies 22–26 and simply notes which loads have exceeded a predetermined load value. In other embodiments, computer 102 only stores information indicative of loads exceeding a predetermined load value. Computer 102 provides an output signal based upon the stored information. Information can later, or simultaneously, be displayed, saved or transferred by output device 106 based upon the output signal provided by computer 102.

In some preferred embodiments of the present invention, for each monitored actuator assembly, computer 102 stores a predetermined load value which bears a known relationship to a maximum recommended total load for the particular actuator assembly and its corresponding boom section. Loads on a particular actuator assembly which exceed the corresponding predetermined maximum load value for a given actuator assembly indicates that the particular actuator assembly and corresponding boom section are supporting a load which exceeds their design limitations. Computer 102 monitors signals from load sensors 28–32 to determine if the load supported by any of actuator assemblies 22–26 has exceeded the corresponding predetermined maximum load value. When a predetermined maximum load value has been exceeded, computer 102 stores information indicative of this occurrence.

In these embodiments, the information stored by computer 102 and provided through output device 106 can be in a variety of formats and may be tailored to provide specifically requested information to a user and/or manufacturer of boom system 10 and monitor system 100. For example, the provided information can simply indicate the occurrence of one or more loads on actuator assemblies 22–26 which exceeded the corresponding predetermined maximum load value. The information provided can specifically identify which of actuator assemblies 22–26 experienced an excessive load, or the information can simply indicate that an excessive load was experienced by one of the assemblies.

The information provided can also be used to indicate a maximum load supported by each of actuator assemblies 22–26 over a given period of time. The maximum load information can identify only the maximum loads, for each actuator assembly, which exceeded the corresponding predetermined maximum load value, or may simply identify the maximum load supported by each of actuator assemblies 22–26 irrespective of whether the maximum load exceeded the corresponding predetermined maximum load value.

In preferred embodiments, clock 104 provides computer 102 with a time base so that computer 102 may store information indicative of the time of each occurrence of a load exceeding a corresponding predetermined load value. The time information may simply indicate a date for each occurrence of an excessive load, or may be more detailed and provide the time of day during each date of occurrence. The stored information is useful in determining exactly when and to what degree boom system 10 was exposed to excessive load conditions. This can be particularly important to boom manufacturers. Boom manufacturers may use this information to schedule boom maintenance and diagnose causes of boom failures. The detailed information allows boom manufacturers to offer warranties on their booms. By accessing the information from computer 102 with output device 106, boom manufacturers may determine if the boom was subjected to excessive conditions and therefore may determine whether the boom warranty is void. Additionally, evidence of a boom being exposed to conditions which exceed its design limitations can be extremely useful during a lawsuit in which the boom manufacturer is being sued for an alleged defect in the boom.

In yet other preferred embodiments of the present invention, at least one predetermined load value for each monitored actuator assembly bears a known relationship to a predetermined minimum operating total load for the respective assembly. The predetermined minimum operating total load for a particular actuator assembly is the load on that assembly which must be exceeded for the assembly and corresponding boom section to be in operation. In other words, each of the predetermined minimum operating load values bears known relationships to minimum loads which must be supported by actuator assemblies 22–26 to lift the corresponding boom sections when boom system 10 is not supporting an external load. The predetermined minimum operating load value for each of assemblies 22–26 is therefore dependent both upon the weight and distribution of weight of boom sections 16–20, and upon the positions of the boom sections relative to one another. Therefore, in preferred embodiments, the predetermined minimum operating load values are values calculated by computer 102 based upon the positions of boom sections 16–20. However, in other embodiments, the predetermined minimum operating load values are constants which sufficiently approximate the necessary minimum loading.

Regardless of whether the predetermined minimum operating load values are constants or variables, in these preferred embodiments, computer 102 monitors the loads on each of actuator assemblies 22–26 for loads exceeding the corresponding predetermined minimum operating load value. Each occurrence of a load on one of actuator assemblies 22–26 which exceeds the corresponding minimum operating load value is indicative of the corresponding actuator assembly and boom section being subjected to a boom cycle.

In preferred embodiments, computer 102 has a register for each of actuator assemblies 22–26 which indicates an overall total number of boom cycles experienced by each assembly and corresponding boom section. Computer 102 updates the corresponding register each time one of actuators assemblies 22–26 supports a load which exceeds the predetermined minimum operating load value. Computer 102 provides to a user of boom system 10 or to the boom manufacturer, through output device 106, an indication of a total number of boom cycles experienced by each of assemblies 22–26. Because each boom cycle subjects components of boom 11 to the fatigue stress, this information can be used by the boom manufacturer to predict fatigue failure on boom components. This is possible because the fatigue life of the boom components, which is the number of repeated stress cycles the boom components can endure before failure, can be determined through life cycle testing. Once again, this information can be used to schedule boom maintenance, to predict or analyze causes of boom failure, and to aid manufacturers in providing and verifying boom warranties.

The methods described above with reference to FIGS. 1 and 2 of monitoring the boom's actuator assemblies to detect excessive load conditions and to predict fatigue failure of boom components is particularly useful to boom manufacturers. This utility can be further enhanced with slight modifications to detect other excessive forces or load conditions on other boom components and/or to predict fatigue failure of these boom components. Numerous boom components other than actuator assemblies and boom sections can be damaged when exposed to excessive forces or load conditions. Also, a great many of the boom components will experience fatigue failure as a result of the repetitious nature of boom movements. Boom system 150 described below provides an effective means of monitoring for and predicting these occurrences.

C. BOOM SYSTEM 150

Figure 3:
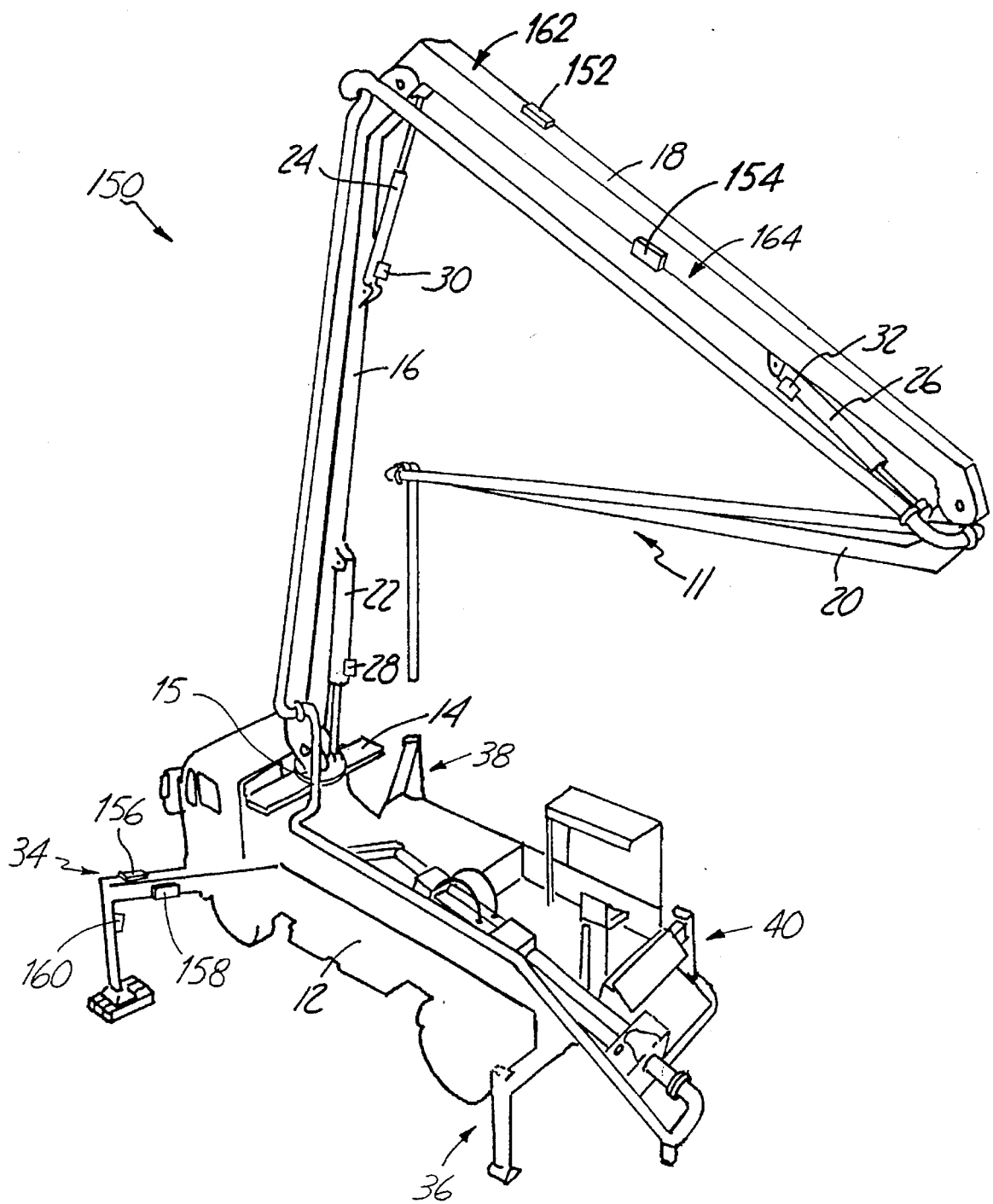
FIG. 3 is a perspective view of an alternate embodiment of a truck mounted boom system in accordance with the present invention.

FIG. 3 shows a perspective view of truck mounted boom system 150. Boom system 150 is identical to boom system 10 shown in FIG. 1, except that boom system 150 includes additional force or load sensors for sensing additional forces and/or loading on various boom components. These additional sensors include load sensors 152, 154, 156, 158, and 160. Load sensors 152–160 are used to monitor various forces which act upon or stress the mechanical components of boom system 150. These stresses may be caused by deflection of the boom components in a number of different manners including lateral tension and compression as well as deflection due to torsional stresses.

Each of sensors 152–160 sense a parameter indicative of loading or of forces acting upon one or more particular components of boom system 150. Specifically, sensors 152 and 154 sense parameters which are indicative of forces acting upon boom section 18. Sensors 156, 158 and 160 sense parameters which are indicative of forces acting upon outrigger 34. It must be noted that in preferred embodiments, sensors are actually located on each boom section and on each outrigger. Further, on any given outrigger or boom section, still more sensors could be added to detect both different types of forces and to detect forces or stresses at different locations on the particular boom component. However, for ease of illustration, only a few sensors are shown, and those sensors shown correspond only to one boom section and one outrigger.

In preferred embodiments, sensors 152, 154, 156, and 158 are strain gages which monitor stresses on the corresponding one of boom section 18 and outrigger 34 caused by deflection of that component. Sensor 152 is attached to top portion 162 of boom section 18. Sensor 154 is attached to side portion 154 of boom section 18. Sensor 156 is attached to top portion 166 of outrigger 34. Sensor 158 is attached to side portion 168 of outrigger 34. By attaching strain gauges on different sides of structural components such as boom section 18 and outrigger 34, deflection of these components in different directions can be sensed.

In preferred embodiments sensor 160 is a hydraulic sensor, similar to sensors 28, 30, and 32, which senses the hydraulic pressure in outrigger 34. Hydraulic pressure in outrigger 34 correlates directly to and is representative of total loads supported by that outrigger.

D. ROTATIONAL ACTUATOR MECHANISMS 200 AND 250

Figure 4:
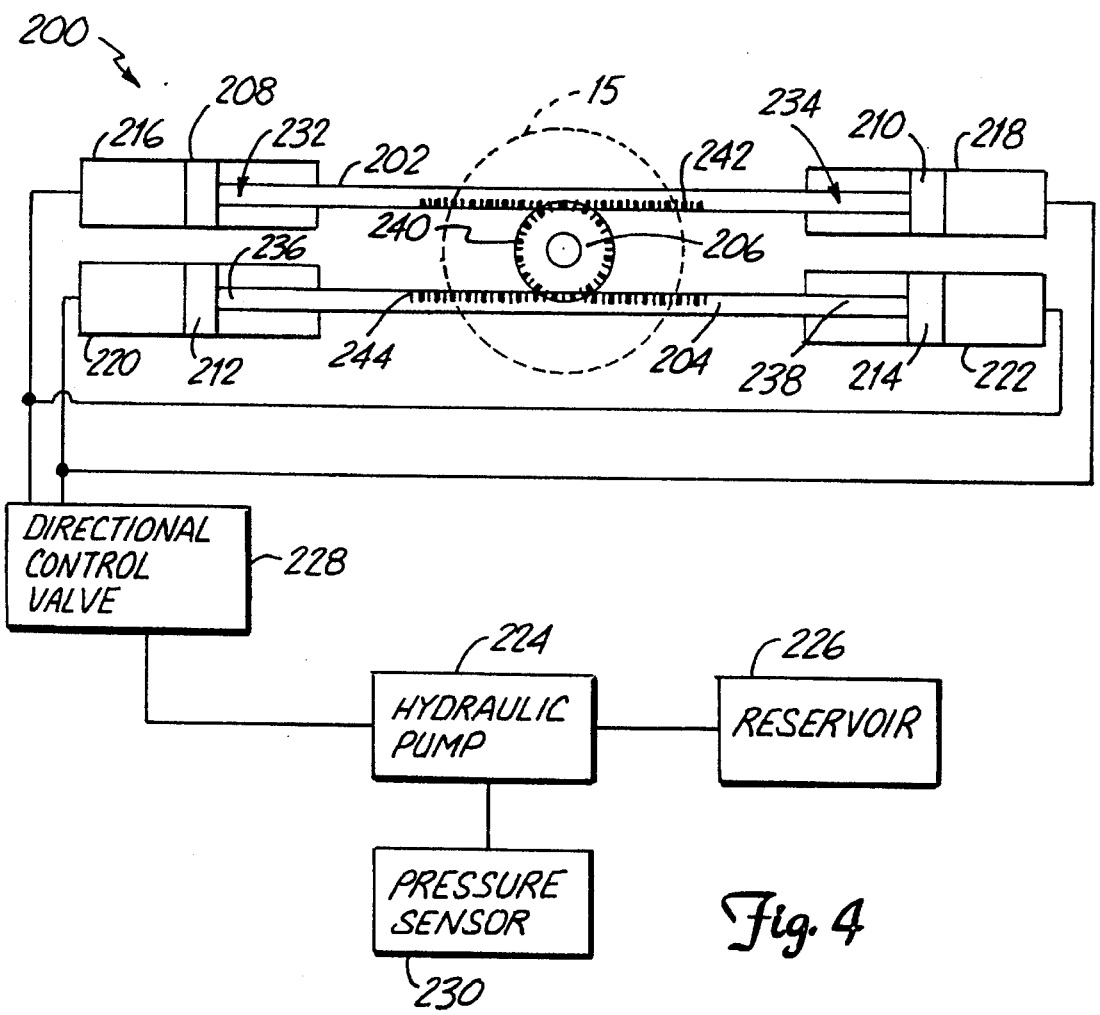
FIG. 4 is a diagrammatic view of a hydraulically-driven rack and pinion system for controlling rotational movement of the boom and for monitoring forces experienced by components of the boom system during rotational movement.

FIG. 4 is a diagrammatic view of hydraulically driven rack and pinion system 200 for controlling rotational movement of boom 11 in boom systems 10 and 150. Rack and pinion system 200 includes turret 15, toothed bars 202 and 204, gear 206, hydraulic pistons 208, 210, 212 and 214, hydraulic cylinders 216, 218, 220 and 222, hydraulic pump 224, hydraulic reservoir 226, directional control valve 228 and pressure sensor 230.

Piston 208 reciprocates in hydraulic cylinder 216. Piston 210 reciprocates in hydraulic cylinder 218. Piston 212 reciprocates in hydraulic cylinder 220. Piston 214 reciprocates in hydraulic cylinder 222. First end 232 of toothed bar 202 is connected to piston 208. Second end 234 of toothed bar 202 is connected to piston 210. Likewise, first end 236 of toothed bar 204 is connected to piston 212 while second end 238 of toothed bar 204 is connected to piston 214. Teeth 240 of gear 206 are engaged or mesh with teeth 242 of bar 202 and teeth 244 of bar 204.

In operation, pump 224 pumps hydraulic fluid from reservoir 226 through directional control valve 228 and to selected hydraulic cylinders. Directional control valve 228 controls the direction of hydraulic fluid flow to and from hydraulic cylinders 216, 218, 220 and 222. In this manner, the rotational direction of travel of gear 206 and turret 15 can be controlled. To rotate turret 15, and thus boom 11, in a clockwise direction, directional control valve 228 causes hydraulic fluid to be pumped to hydraulic cylinders 216 and 222, while causing hydraulic fluid to be pumped away from hydraulic cylinders 218 and 220. This causes bars 202 and 204 to move in opposite linear directions with respect to one another, which results in gear 206 and turret 15 rotating clockwise. Similarly, to rotate turret 15 and boom 11 counterclockwise, directional control valve 228 causes hydraulic fluid to be pumped to hydraulic cylinders 218 and 220, while causing hydraulic fluid to be pumped away from hydraulic cylinders 216 and 222.

Pressure sensor 230 monitors the pressure of hydraulic fluid pumped from hydraulic pump 224. When rotating the boom, a boom section can come in contact with a building, another piece of machinery, or other heavy obstacles. Also, the boom's distribution hose can get tangled with objects on the ground. When any of these undesirable events occur, boom sections, boom section joints and other boom components may be exposed to excessive forces and load conditions. The hydraulic pressure generated by hydraulic pump 224 will be indicative of the magnitude of these forces since hydraulic pump 224 must generate hydraulic fluid pressure capable of overcoming these forces and rotating turret 15 and boom 11.

Figure 5:
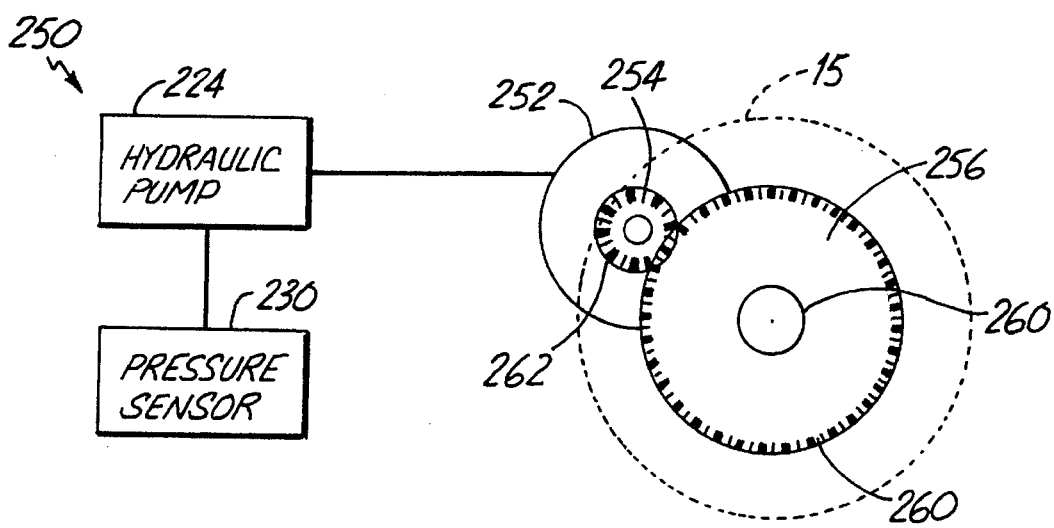
FIG. 5 is a diagrammatic view of a second embodiment of a hydraulically driven system for controlling rotational movement of the boom and for monitoring forces experienced by components of the boom system during rotational movement.

FIG. 5 is a diagrammatic view of a second embodiment of a hydraulically driven mechanism for controlling rotational movement of boom 11. As shown in FIG. 5, hydraulically driven gear motor 250 includes turret 15, motor 252, gear 254, gear 256, hydraulic pump 224 and pressure sensor 230. Motor 252 is connected to gear 254 via shaft 258. Gear 256 and turret 15 are connected via shaft 260. Hydraulic pump 224 drives motor 252 in order to rotate shaft 258 and gear 254 in either a clockwise or counterclockwise direction. Teeth 262 of gear 254 are meshed or engaged with teeth 264 of gear 256. Therefore, as gear 254 rotates in either a clockwise or counterclockwise direction, gear 256 will rotate in the opposite direction. Rotation of gear 256 causes shaft 260 and turret 215 to rotate in the same direction. In this manner, boom 11 can be rotated a full 360°.

Pressure sensor 230 once again monitors the pressure of hydraulic fluid pumped by hydraulic pump 250. Therefore, information from pressure sensor 230 is indicative of total loads or forces which oppose rotational movement of boom 11.

E. MONITOR SYSTEM 300

Figure 6:
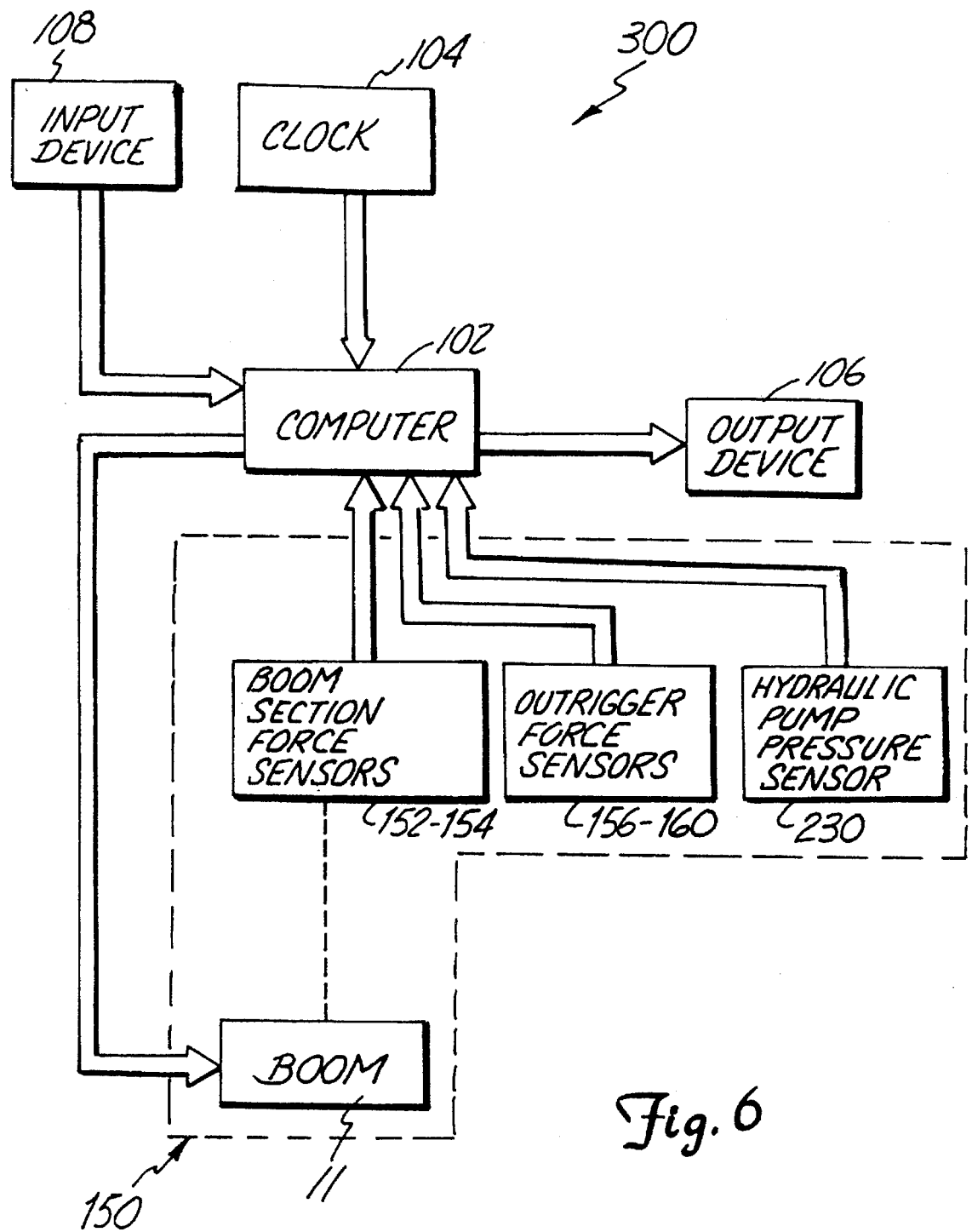
FIG. 6 is a block diagram of an alternate embodiment of a monitoring system for booms in accordance with the present invention.

FIG. 6 shows a second preferred embodiment of a monitoring system which monitors the operation of boom system 150 to provide accurate information on the use of boom 11. Like monitor system 100, monitor system 300 shown in FIG. 6 is used to schedule boom maintenance, verify boom warranties and predict or analyze causes of boom failure. Monitor system 300 includes boom system 150, computer 102, clock 104, output device 106 and input device 108. Computer 102, clock 104, output device 106 and input device 108 are, in preferred embodiments, substantially the same as in monitor system 100.

Once again, sensors 152 and 154 sense parameters indicative of the loads or forces acting on boom section 118. Sensors 156, 158 and 160 sense parameters indicative of loads or forces acting on outrigger 34. Sensor 230 senses hydraulic pressure which is indicative of loads or forces which act upon various boom components to oppose rotational movement of boom 11. All of sensors 152, 154, 156, 158, 160 and 230 provide signals to computer 102 which are indicative of these various loads or forces.

As is the case with monitor system 100, in monitor system 300, one or more predetermined load values are stored in the memory of computer 102. At least one predetermined load value is stored for each sensor monitored by system 300. However, in some preferred embodiments, multiple predetermined load values are stored for each sensor monitored. In these embodiments, each of the multiple predetermined load values for a particular sensor represents a different degree of loading on a corresponding boom component. Preferably, these multiple load values include a predetermined maximum load value and a predetermined minimum operating load value for the respective boom components just as was the case in monitor system 100.

The predetermined load values are predetermined values of the parameter sensed by each of sensors 152–160 and 230 which correspond to predetermined loads or forces on corresponding boom system 150 components. Computer 102 receives signals from sensors 152–160 and 230 and thereby monitors the load on each of the corresponding boom system components. Based upon the monitored load or forces acting upon each boom system component, computer 102 determines when the load or forces acting on a particular component have exceeded a predetermined load value for that component.

As was the case in monitoring system 100, computer 102 stores information based upon the sensed loads or forces acting upon each boom system component. The stored information is indicative of loads on one or more of the boom components and is further indicative of loads which have been determined by computer 102 to have exceeded the corresponding predetermined load value. In some embodiments, computer 102 stores information indicative of all loads supported by or forces acting upon a particular boom component and simply notes which loads have exceeded a predetermined load value. In other embodiments, computer 102 only stores information indicative of loads exceeding a predetermined load value. Computer 102 provides an output signal based upon the stored information.

In the preferred embodiments of the present invention in which at least one predetermined load value for each sensor or boom component bears a known relationship to a maximum recommended total load for the boom component, loads sensed which exceed the predetermined maximum load value indicate that the particular boom component has supported a load or been exposed to forces which exceeded its design limitations. When a predetermined maximum load value has been exceeded, computer 102 stores information indicative of the occurrence. As before, the information stored by computer 102 may be provided through output device 106 and can be in a variety of formats designed to provide specifically requested information to a user and/or manufacturer of boom system 150 and monitor system 300. For example, the provided information can simply indicate the occurrence of one or more loads which exceeded the corresponding predetermined maximum load values. Alternatively, the information provided can be used to indicate a maximum load supported by each boom component over a given period of time. The information can also identify the maximum load supported by each boom component irrespective of whether the maximum loads exceeded the corresponding predetermined maximum load values.

As was the case with monitor system 100, in preferred embodiments of monitor system 300, clock 104 provides computer 102 with a time base so the computer 102 may store information indicative of the time and/or date of each occurrence of a load or force which exceeded a corresponding predetermined load value. This stored information is useful in determining exactly when and to what degree boom system 150 was exposed to excessive load conditions.

Access to this type of information is useful to boom manufacturers wishing to offer warranties on their booms. Retrieving this information from computer 102 using output device 106, boom manufacturers may determine if the boom was subjected to excessive conditions and therefore, may determine whether the boom warranty is void.

In preferred embodiments of boom system 300, at least one predetermined load value for each sensor bears a known relationship to a predetermined minimum operating total load for the corresponding boom component. The predetermined minimum operating total load for a particular component is the load or forces on that component which must be exceeded for that boom component to have experienced a cycle. Each cycle represents one of many repetitious loads or forces which a boom component can withstand before failing due to fatigue or stress.

In preferred embodiments, computer 102 has a register for each monitored boom component which indicates an overall total number of boom cycles experienced by that component. Computer 102 updates the corresponding register each time one of sensors 152–160 indicates that the particular boom component has supported a load or been subjected to a force which exceeds the applicable predetermined minimum operating load value. Computer 102 provides to a user of boom system 150 or to the boom manufacturer, through output device 106, an indication of a total number of boom cycles experienced by each monitored boom component. Because each boom cycle subjects components of boom 11 to fatigue stress, this information can be used by the boom manufacturer to predict fatigue failure on boom components. Once again, this information can be used to schedule boom maintenance, to predict or analyze causes of boom failure, and to aid manufacturers in providing and verifying boom warranties.

Although the present invention has been described with reference to preferred embodiments, workers skilled in the art will recognize that changes may be made in form and detail without departing from the spirit and scope of the invention.

What is claimed is:

1. A method of monitoring operation of a boom system comprising:

sensing a first parameter indicative of a load on a first boom system component, the load on the first boom system component being a function of one or more forces acting on the boom system component;

determining, from the sensed first parameter, when the load on the first boom system component exceeds a predetermined value;

storing information indicative of an occurrence of a load on the first boom system component which exceeded the predetermined value; and determining whether a boom warranty is in effect based upon the stored information.

2. The method of claim 1 wherein storing information further includes storing a date during which the load on the first boom system component exceeded the predetermined value.

3. The method of claim 1 wherein storing information further includes storing a time during which the load on the first boom system component exceeded the predetermined value.

4. The method of claim 1 wherein storing information further includes storing a magnitude of the load on the first boom system component which exceeded the predetermined value.

5. The method of claim 1 wherein storing information further includes storing a maximum load on the first boom system component.

6. The method of claim 1 wherein storing information further includes storing a number of occurrences of loads on the first boom system component, each of which exceeded the predetermined value.

7. The method of claim. 1 wherein the predetermined value bears a known relationship to a maximum recommended load for the first boom system component.

8. The method of claim 1 wherein the first parameter is a signal provided by a strain gauge coupled to the first boom system component, the signal being indicative of mechanical stress on the first boom system component.

9. The method of claim 1 wherein the first boom system component is a boom section.

10. The method of claim 1 wherein the first boom system component is an outrigger which stabilizes the boom system against the weight of an extended boom.

11. The method of claim 1 wherein the parameter sensed is hydraulic pressure.

12. The method of claim 11 wherein the hydraulic pressure is indicative of forces acting on the first boom system component to oppose rotational movement of the first boom system component.

13. The method of claim 11 wherein the first boom system component is an outrigger, and wherein the hydraulic pressure is indicative of a load supported by the outrigger.

14. The method of claim 1 wherein the predetermined value bears a known relationship to a minimum operating total load for the first boom component which must be exceeded for the first boom component to have experienced a fatigue stress cycle.

15. The method of claim 14 wherein storing information further comprises storing information indicative of a total number of fatigue stress cycles experienced by the first boom component.

16. A method of monitoring operation of a boom system having boom components including a boom with at least one boom section, including at least one outrigger for supporting and stabilizing the boom system against the weight of the boom, and including a rotational actuator mechanism for rotating the boom, the method comprising:

sensing a first parameter which is indicative of a magnitude of forces acting on a first boom system component;

determining from the sensed first parameter when the magnitude of the forces acting on the first boom system component exceeds a predetermined value;

storing information indicative of an occurrence of forces acting on the first boom system component which have a magnitude which exceeded the predetermined value, wherein storing information includes storing a date during which the magnitude of the forces acting on the first boom system component exceeded the predetermined value; and providing an output based upon stored information.

17. The method of claim 16 wherein storing information further includes storing a time during which the magnitude of the forces acting on the first boom system component exceeded the predetermined value.

18. The method of claim 16 wherein storing information further includes storing a maximum value of the magnitude of the forces acting on the first boom system component.

19. The method of claim 16 wherein storing information further includes storing a number of occurrences of forces acting on the first boom system component, each of which has a magnitude which exceeded the predetermined value.

20. The method of claim 16 wherein the predetermined value bears a known relationship to a maximum recommended magnitude of forces acting on the first boom system component.

21. The method of claim 16 and further comprising:

determining whether a boom warranty is in effect based upon the output.

22. The method of claim 16 and further comprising:

scheduling boom maintenance based upon the output.

23. A system for monitoring operation of a boom comprising:

a first sensor coupled to the boom, the first sensor providing a first sensor output indicative of forces acting on a first boom component;

means for determining, from the first sensor output, when the forces acting on the first boom component exceed a predetermined value;

means for storing information indicative of an occurrence of forces acting on the first boom component which exceeded the predetermined value; and providing an output based upon the stored information.

24. The system of claim 23 and further comprising:

means for predicting fatigue failure of the first boom component based upon the output.

25. The system of claim 23 and further comprising:

means for determining whether a boom warranty is in effect based upon the output.

* * * * *

UNITED STATES PATENT AND TRADEMARK OFFICE
CERTIFICATE OF CORRECTION

PATENT NO. : 5,557,526
DATED : SEPTEMBER 17, 1996
INVENTOR(S) : THOMAS M. ANDERSON

It is certified that error appears in the above-indentified patent and that said Letters Patent is hereby corrected as shown below:

Col. 2, line 20, delete "three", insert --force--

Col. 3, line 5, after "truck", insert --12--

Col. 12, line 8, after "claim.", delete "."

Signed and Sealed this

Eleventh Day of February, 1997

Attest:

BRUCE LEHMAN

*Attesting Officer*  *Commissioner of Patents and Trademarks*